(12) United States Patent
Campbell et al.

(10) Patent No.: US 7,258,061 B2
(45) Date of Patent: Aug. 21, 2007

(54) SEMI-AUTOMATIC BEVERAGE MAKING APPARATUS

(75) Inventors: Bernie Campbell, Sherfield on Loddon (GB); Michael Wright, Stockbridge (GB); Philippe Jard, Downingtown, PA (US)

(73) Assignee: Mars, Inc., McLean, VA (US)

( * ) Notice: Subject to any disclaimer, the term of this patent is extended or adjusted under 35 U.S.C. 154(b) by 396 days.

(21) Appl. No.: 10/890,680

(22) Filed: Jul. 14, 2004

(65) Prior Publication Data

US 2005/0022674 A1 Feb. 3, 2005

(30) Foreign Application Priority Data

Jul. 17, 2003 (GB) ................................. 0316778.0

(51) Int. Cl.
*A47J 31/00* (2006.01)

(52) U.S. Cl. ...................... 99/283; 99/285; 99/289 R; 99/290; 99/295; 99/323

(58) Field of Classification Search ................. 99/295, 99/280, 281, 282, 283, 285, 289 R, 290, 99/291, 300, 323; 426/112, 115, 77, 82
See application file for complete search history.

(56) References Cited

U.S. PATENT DOCUMENTS 4,963,743 A * 10/1990 Satake et al. .......... 250/339.07

2004/0148107 A1 * 7/2004 Piotrowski et al. ........... 702/31
2006/0188620 A1 * 8/2006 Gutwein et al. ............ 426/433

FOREIGN PATENT DOCUMENTS

| CA | 2411809 | * | 5/2004 |
| EP | 0 179 641 | | 4/1986 |
| EP | 0 449 533 | | 10/1991 |
| EP | 0 451 980 | | 10/1991 |
| GB | 2 121 762 | | 1/1984 |
| WO | WO-02/19875 | | 3/2002 |
| WO | WO-02/28241 | | 4/2002 |

* cited by examiner

*Primary Examiner*—Reginald L. Alexander
(74) *Attorney, Agent, or Firm*—Fulbright & Jaworski; Jan K. Simpson

(57) ABSTRACT

A beverage making system that includes a plurality of packs containing different beverage making ingredients and having different infrared reflectance spectra in a region thereof. A beverage making apparatus includes a station for receiving at least one of the packs; a source of liquid adapted to supply liquid into the at least one pack while the pack is located at the station; a system controller for controlling the supply of liquid from the source according to a beverage making program; and an infrared pack recognition system comprising an infrared light source for illuminating the region of the pack while it is located at the station. The apparatus also includes a detector for measuring an intensity of infrared light reflected from the region and for supplying an output signal to the system controller, whereby the beverage-making program is selected by the system controller in response to the output of the infrared pack recognition system.

10 Claims, 3 Drawing Sheets

SEMI-AUTOMATIC BEVERAGE MAKING APPARATUS

CROSS-REFERENCE TO RELATED APPLICATIONS

This application claims priority to GB 0316778.0 filed Jul. 17, 2003.

TECHNICAL FIELD

The present invention relates to a beverage making machine incorporating infrared pack recognition equipment, whereby the machine recognizes the type of beverage pack being inserted into the machine and automatically selects an appropriate beverage-making program for that pack.

BRIEF SUMMARY OF THE INVENTION

The term "semi-automatic beverage making machines" refers to machines that are adapted to prepare a beverage from a pack containing a beverage ingredient that has been selected by an operator from a range of different packs, for example a pack taken from a display rack adjacent to the machine. The operator inserts the pack into a beverage making station of the machine, and the machine then prepares a beverage from the pack, usually by injecting water into the pack and extracting the prepared beverage through one or more outlets in the pack. Such machines can sometimes prepare a range of different beverages, for example coffee, tea, soup, chocolate, or flavored cold drinks. Beverage packs for use in machines of this type are described, for example in WO94/01344, EP-A-0512468 and EP-A-0468079 (all Nestle), in U.S. Pat. No. 5,840,189 (Keurig), in EP-A-0272922 (Kenco), and in EP-A-0179641 and WO02/19875 (Mars).

The optimum conditions of water temperature, pressure, and flow rate as a function of time for making each kind of beverage from its respective pack will depend on the particular beverage being made and the characteristics of the pack that has been selected. Hitherto, there has been limited scope to optimize these parameters for each pack, and such optimization has depended on the operator correctly selecting the most suitable program for the selected pack, for example by pressing a button or making a soft key selection. This is unsatisfactory, especially as the machines are capable of making an increasingly wide range of beverages. For example, some machines can make espresso and cappuccino coffee in addition to filter coffee, in some cases even from the same coffee pack.

EP-A-0451980 and EP-A-0449533 describe beverage making capsules incorporating a pack recognition means. The pack recognition is provided by a row of projecting pegs in the capsule. The projecting pegs engage with the pack recognition mechanism in the brewer, which is linked to the control system to provide optimum brewing conditions for that pack. There is no disclosure of measuring infrared reflectance of the packs.

WO-A-02028241 describes a variety of beverage brewing capsules incorporating a variety of pack recognition features for recognition by a beverage brewer. The patent application mentions the use of bar codes, characteristic shapes, (which may be colored), binary coding, a glyph, a digital watermark, or characteristic notches, grooves or perforations in the capsule. The reference does not teach or suggest measuring an IR reflectance over an area of the capsule.

A need exists for improved semi-automatic beverage making machines that can provide for a wider range of beverage making conditions, and that can select the best conditions for each different pack in an automated fashion.

BACKGROUND OF THE INVENTION

The present invention provides a beverage making system that includes a plurality of packs containing different beverage making ingredients and having different infrared reflectance spectra in a region thereof. A beverage making apparatus includes a station for receiving at least one of the packs; a source of liquid adapted to supply liquid into the at least one pack while the pack is located at the station; a system controller for controlling the supply of liquid from the source according to a beverage making program; and an infrared pack recognition system comprising an infrared light source for illuminating the region of the pack while it is located at the station. The apparatus also includes a detector for measuring an intensity of infrared light reflected from the region and for supplying an output signal to the system controller, whereby the beverage-making program is selected by the system controller in response to the output of the infrared pack recognition system.

The beverage making machine will usually be a semi-automatic beverage making machine as hereinbefore defined, but in certain embodiments it may be a fully automatic machine, that is to say a machine that stores a plurality of the packs and releases a pack into the beverage making station automatically in response to an operator command to select and make a beverage.

The term "pack" refers to any container having stored therein a predetermined quantity of a beverage making ingredient. The packs may be open containers, such as cups, for example those provided by in-cup dispensing or vending systems. In other embodiments, the packs may be filter packs, for example tubular bodies shaped and dimensioned to rest on the top of a cup and having a filter across the bottom thereof, a beverage making ingredient such as ground coffee over the filter in the bottom of the container, and an open top for introduction of hot water. However, most usually the packs for use in the present invention are capsules, that is to say fully enclosed packages containing the beverage making ingredient. Preferably, the capsules are substantially air- and moisture-impermeable.

The pack contains a beverage-making ingredient. Suitable ingredients include tea (leaf or instant), coffee (ground or instant), drinking chocolate (powder or concentrate), beverage whitener (solid or liquid), or a soft drink concentrate such as a water soluble or water dispersible syrup or sweetened powder concentrate. In certain embodiments, the beverage making ingredient is an infusible beverage brewing ingredient, such as leaf tea or ground coffee. In such embodiments the pack may further comprise a filter sheet inside the pack and bonded to an internal surface of the pack. Typically, the amount of ingredient in the pack is sufficient for the preparation of one portion of beverage, i.e. from about 25 to about 500 ml, preferably from about 100 ml to about 250 ml. For example, the package may contain from about 2 g to about 25 g of ground coffee or from about 1 g to about 9 g of leaf tea.

Typically, each pack comprises a plastics sheet (e.g. thermoformed or injection molded sheet) or flexible film material, and the region that is recognized by the infrared pack recognition system is located on the sheet or flexible film material. The region may be a specially printed or coated region, but it is a particular advantage of the present invention that by suitable selection of wavelength range and aperture it is possible to achieve pack recognition using prior art packs, without any dedicated printing or coating.

The sheet or flexible film material will usually be a laminate comprising two or more of the following layers: a thermoplastic sealant layer for bonding the sheet to other members of the package; a substantially gas-impermeable barrier layer, which preferably is a metal film such as aluminum film; adhesion layers to improve adhesion between other layers of the laminate; structural layers, for example to provide puncture resistance; and/or a printing substrate layer. The structural layers could be made of polyolefins, polyester, nylons, or other polymers as is well known in the art.

It has been found that especially good pack recognition can be achieved by infrared reflectance from a region formed from a metallised sheet or film material, wherein the reflective metal layer is covered by a partially transparent layer, for example a layer of colored plastic film or printed transparent or semi-transparent material.

In certain embodiments, the pack comprises two flexible films bonded in face to face relationship to provide a flexible sachet. In other embodiments, a sachet is formed by folding-over a single film, and bonding the edges of the film together to form the edges of the sachet.

In certain embodiments, the pack further comprises a nozzle for water injection into the pack. The nozzle may be inserted into a top edge of the pack. In other embodiments, there is no nozzle, for example if the water is to be injected into the package through a hollow injector tube that pierces a side of the package.

In certain embodiments, the pack consists essentially of oxygen-impermeable sheet material, optionally a filter material inside the pack body, and optionally an injection nozzle.

Suitable sachet and pack constructions are as described in WO94/01344, EP-A-05 12468, EP-A-0468079, U.S. Pat. No. 5,840,189, EP-A-0272922, EP-A-0 179641 and WO02/19875, the entire contents of which are incorporated herein by reference The pack is received in a beverage making station of the apparatus. The station is shaped and configured to hold the pack while beverage preparation is taking place. The station may comprise a clamp to grip at least a portion of the pack while beverage preparation is taking place. In certain embodiments, the station may fully enclose and clamp the pack (apart from necessary liquid inlets and outlets for beverage preparation) while beverage preparation is taking place, and in such embodiments the station may exert pressure on the pack, for example when beverage preparation takes place under pressure in espresso-type coffee brewing.

In the system according to the present invention, the source of liquid suitably comprises an injector for injecting liquid into the pack. The injector may be adapted to pierce the pack, or it may be adapted for insertion into a nozzle provided in the pack.

The apparatus is adapted to prepare a beverage from the pack by injecting water according to a predetermined program that is optimized for that pack. Typically, the source of liquid can be programmed by the control system to provide a plurality of different beverage making programs characterized by one or more parameters selected from the group consisting of temperature, pressure and flow rate (each of which may be independently variable and programmable as a function of time), total volume, or combinations thereof. For example, espresso coffee brewing preferably uses a small volume of water injected into a bed of coffee at 1 MPa or more, at a temperature of about 90° C. Filter coffee brewing preferably uses a larger volume of water at 0.2 MPa or less and about 90° C. In certain embodiments, for example coffee or tea infusion, the water is not injected continuously, but instead it is injected in pulses to allow time for the beverage to infuse between pulses. The apparatus may also be adapted to inject air into the pack after the last water injection step, in order to expel as much beverage as possible from the pack, and/or it may be adapted to squeeze the pack after the last water injection step for the same reason. Suitable apparatus is described, for example in WO02/19875 and GB-A-2121762, the entire contents of which are incorporated herein by reference.

A suitable infrared (IR) wavelength range for operation is from about 750 nm to about 1200 nm, for example from about 800 nm to about 1100 nm. It will be appreciated that the infrared pack recognition system of the present invention may measure the reflectance at more than one wavelength and/or in more than one region of the pack in order to achieve greater accuracy and reliability. However, it is an advantage of operating in the infrared region of the spectrum that a single measurement (data point) of IR reflectance averaged over the measurement wavelength band and/or averaged over an area of the pack can be used to discriminate effectively between packs, in particular without special printing or treatment of the packs.

It has been found for example that different packs made in accordance with EP-A-0179641 and supplied under the Registered Trade Mark FLAVIA® by Four Square Division of Masterfoods, Basingstoke, UK, are readily distinguishable in this region of the infrared without any need for special marking or coating.

A further advantage of IR is that it is possible to discriminate effectively between different packs by measuring the wavelength at a single wavelength in the IR region (e.g. as produced by an IR laser diode), so that one does not need multiple sources or tuneable sources. IR also enables pack recognition to be separated from the visual design. In certain embodiments, different packs in the system have a constant visible color in the region where reflectance is measured, but varying IR reflectance in that region. There may even be an invisible IR barcode or anti-counterfeiting feature.

Typically, the infrared pack recognition system comprises an integrating sphere. The use of integrating spheres for the optical measurement geometry in reflectance colorimetry is described in the Commission Internationale De L'Eclairage (CIE) Publication Number 15.2 (Colorimetry), 1986, the disclosure of which is incorporated by reference herein. An integrating sphere is an apparatus with an interior cavity (typically spherical) having a highly reflective, infraredly diffuse white surface. The simplest integrating sphere design contains two apertures, one which admits light and another which serves as a measurement port where the amount of light on the surface of the sphere can be measured. An integrating sphere has the property that at any point on the inner surface of the sphere the illumination is essentially independent of the direction and location of the incident beam as well as the size of the beam; the inner surface is uniformly illuminated throughout, except at the point of direct illumination. Integrating spheres are used in colorimetry for the precise determination of color for a sample under test. The integrating sphere aperture may be directly covered by the pack under test, or it may contact the pack through a window or a lens.

The apparatus according to the present invention may be adapted to measure a sample with the specular component of reflection (mirror-like reflection from the surface) either included (SCI mode) or excluded (SCE mode). Other aspects of measurement may include selection of the measurement aperture size (typically from about 10 to about 400 mm$^2$, for example from about 25 to about 100 mm$^2$), spectral content of the illumination, and angle of receiver beam with respect to the sample normal. The apparatus may comprise multiple detectors for different regions of the pack, and/or equipment to provide relative movement of the pack and the detector(s) to achieve still greater reliability similar to that achieved by modern bank note recognition systems.

A further important feature that may be present in the infrared pack recognition system is a self-calibration feature. Preferably, the apparatus according the present invention further provides a reference surface, which is preferably white, and which is seen by the pack recognition system when there is no pack in the beverage making station. The system self-calibrates in each wavelength range of interest by reference to the measured reflectance of this surface, and also preferably by reference to a standard dark measurement (light source off).

BRIEF DESCRIPTION OF THE DRAWINGS

Specific embodiments of the present invention will now be described further, by way of example, with reference to the accompanying drawings, in which.

DETAILED DESCRIPTION OF THE INVENTION

Figure 4:
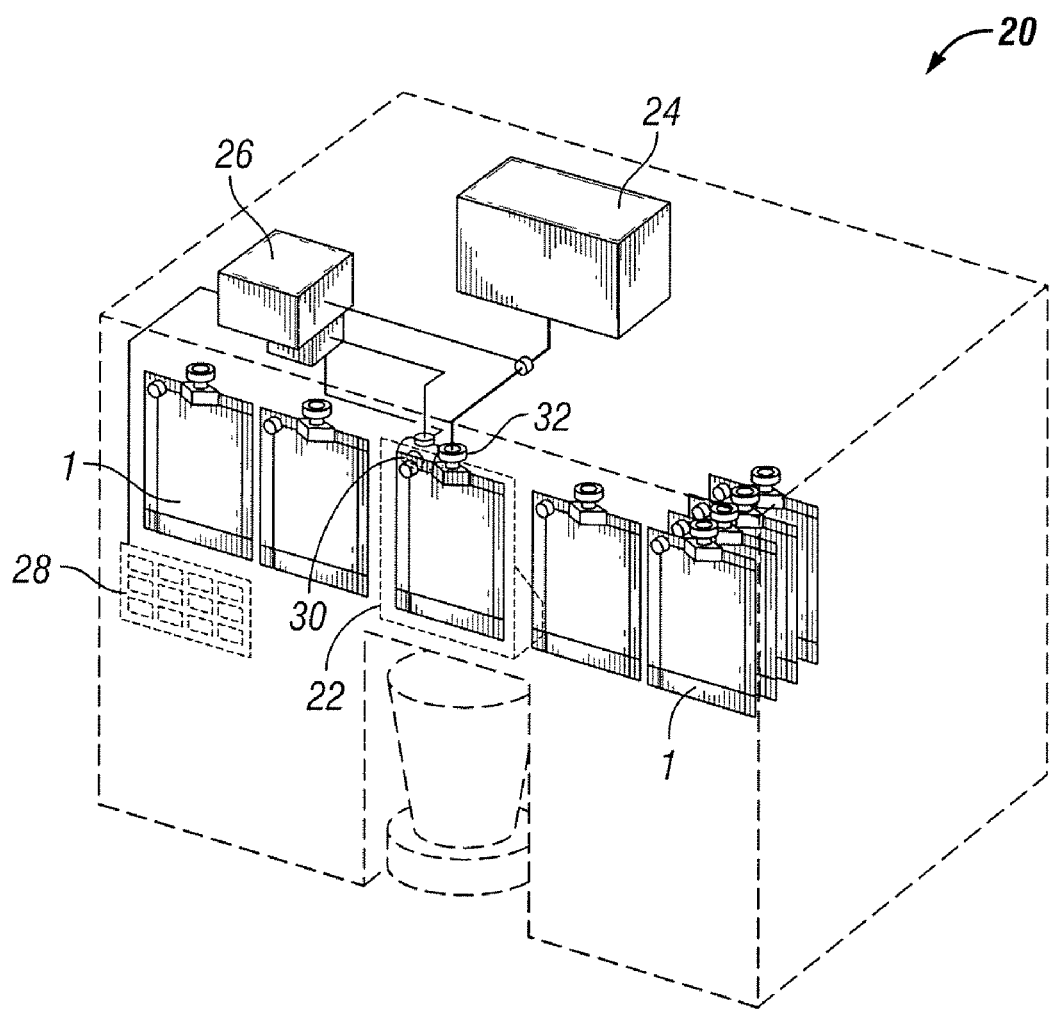
FIG. 4 shows a perspective view of the beverage making apparatus.

Referring to FIG. 4, the beverage making apparatus 20 includes a station 22 for receiving at least one of the packs or sachets 1, a source of liquid 24 adapted to supply liquid into the at least one pack 1, while the pack 1 is located at the station 22; a system controller 26 for controlling the supply of liquid from the source 24 according to a beverage making program 28; and an infrared pack recognition system 30 comprising an infrared light source for illuminating the region of the pack 1 while it is located at the station 22. The source of liquid 24 suitably comprises an injector 32 for injecting liquid into the pack 1.

Figure 1:
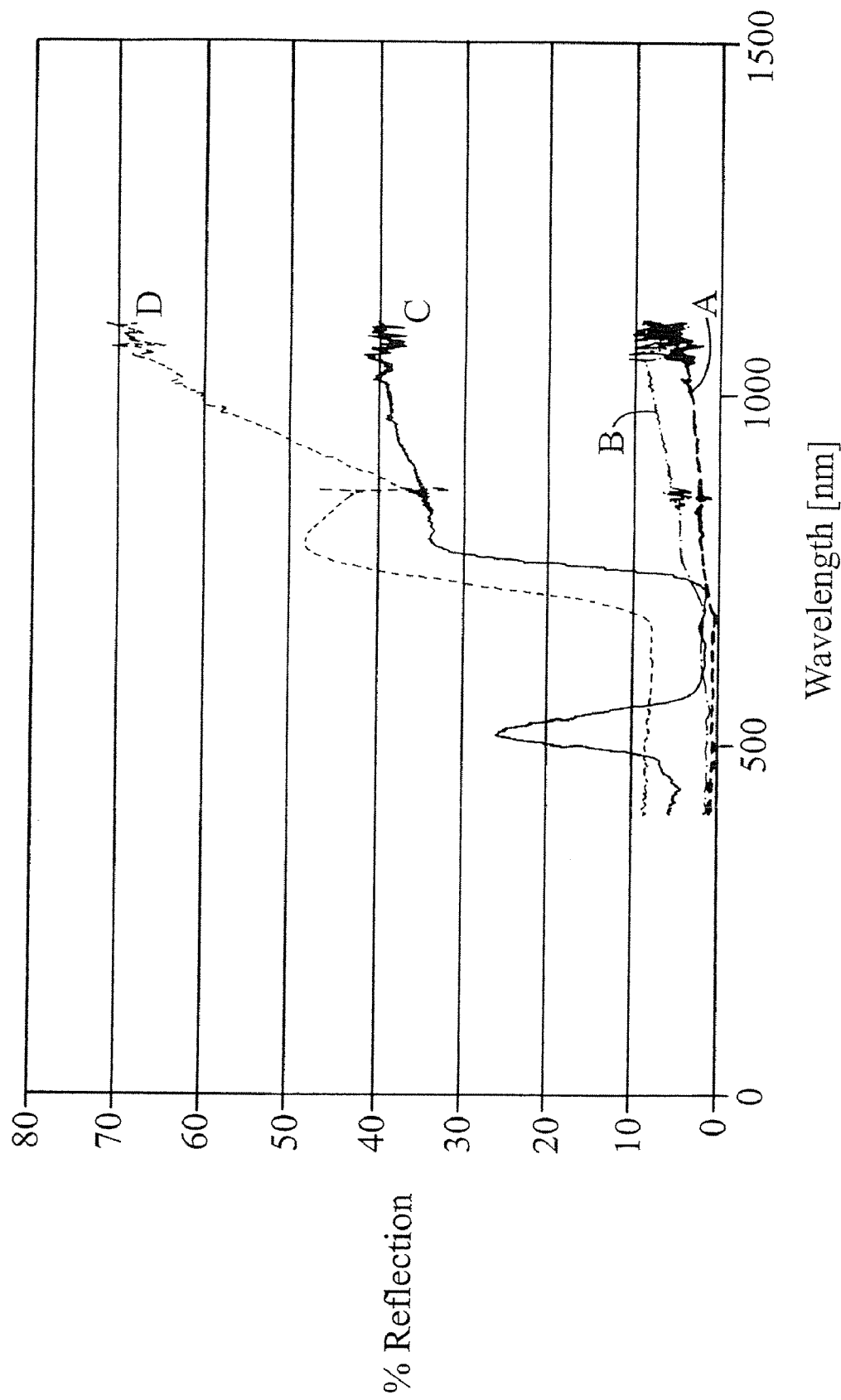
FIG. 1 shows reflectance spectra for four different FLAVIA® sachets.

Referring to FIG. 1, reflectance spectra are shown for four commercially available FLAVIA® beverage sachets, measured with an Ocean Optics spectrometer in reflectance mode with an integrating sphere. Specifically, the measurement was made on a top corner of the sachets using an aperture of 0.4 inches (10 mm) but with no special printing or coating of the sachets. The specular component was included. The sachets tested were (A) a coffee pack having a generally black decorative scheme, (B) a chocolate pack having a generally brown color scheme, (C) a tea pack having a generally green color scheme and (D) a whitener pack for cappuccino having a generally silver color scheme. It can be seen from FIG. 1 that wide variations in the absorbance in the IR region of 750 nm to 1100 nm can be used to distinguish between the sachets.

Figure 2:
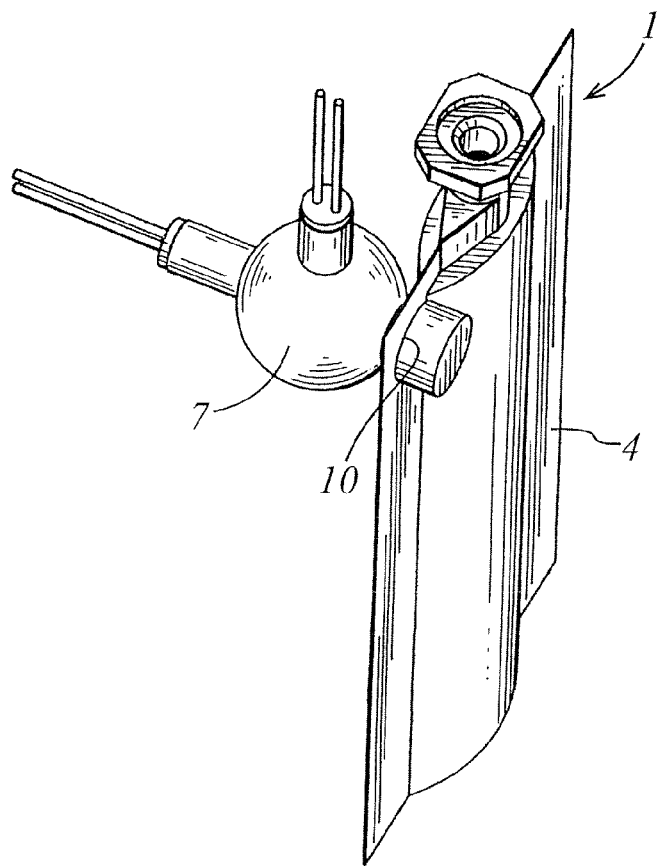
FIG. 2 shows a perspective view of part of a system according to the present invention showing a FLAVIA®-type sachet and an infrared pack recognition sensor.
Figure 3:
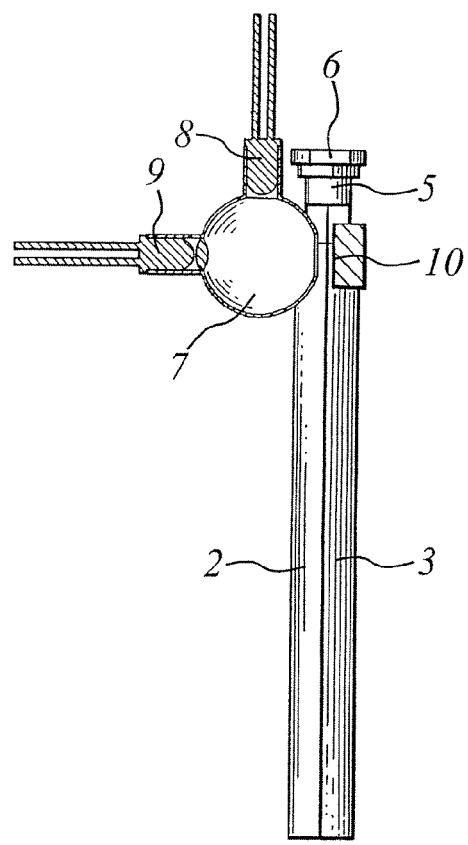
FIG. 3 shows a schematic longitudinal cross-section through the embodiment of FIG. 2.

Referring to FIGS. 2 and 3, the FLAVIA® sachets 1 comprise front and back faces 2, 3 of laminated sheet material that are bonded together around margin 4. A nozzle 5 is inserted into the top of the sachet. The nozzle 5 has a top flange 6, and in use the beverage making apparatus clamps the sachet in the beverage brewing position by gripping the nozzle 5 below the flange 6. The laminated sheet material used to make the sachet comprises an aluminum metal layer, with one or more partially transparent colored and/or printed polymer layers laminated on the outer surface thereof. The appearance of the sachet is thus determined mainly by light reflected from the aluminum layer through the outer layers.

Referring to FIGS. 2 and 3, the infrared pack recognition means 30 comprises an integrating sphere 7, an IR light source 8, and an IR light detector 9. The source is an IR light-emitting diode of the type used for domestic remote-control handsets, specifically a Siemens SFH 484/485 GaAlAs 880 nm diode. The detector is a silicon NPN phototransistor, specifically a Siemens SFH 300. The source 8 and the detector 9 are positioned at right angles to each other. The apparatus also includes a white reference surface 10 to support the sachet against the integrating sphere, and also to calibrate the system when no sachet is present. Calibration is carried out by linear interpolation between a dark measurement (LED off) and a white measurement (reference surface only).

The above embodiment has been described by way of example only. Many other embodiments falling within the scope of the accompanying claims will be apparent to the skilled reader.

What is claimed is:

1. A beverage making system comprising:
   a plurality of packs containing different beverage making ingredients, said packs having different infrared reflectance spectra in a region of the packs;
   a beverage making apparatus comprising a station for receiving at least one of the packs;
   a source of liquid adapted to supply liquid into the at least one pack while the pack is positioned at the station;
   a system controller for controlling the supply of liquid from said source according to a beverage making program;
   and an infrared pack recognition system comprising an infrared light source for illuminating the said region of the pack while it is located at the said station and a detector for measuring an intensity of infrared light reflected from the said region and for supplying an output signal to the system controller,
   wherein the beverage-making program is selected by the system controller in response to the output of the infrared pack recognition system.

2. A beverage making system according to claim 1, wherein each said pack is a capsule enclosing a predetermined portion of the beverage making ingredient.

3. A beverage making system according to claim 1, wherein each pack comprises a flexible film material, and said region is located on the flexible film material.

4. A beverage making system according to claim 1, wherein the source of liquid comprises an injector for injecting liquid into the pack.

5. A beverage making system according to claim 1, wherein the source of liquid can be programmed by the control system to provide a plurality of different beverage making programs.

6. A beverage making system according to claim 5, wherein the different beverage making programs are characterized by one or more parameters selected from the group consisting of temperature, pressure and/or flow rate as a function of time, total volume, or combinations thereof.

7. A beverage making system according to claim 1, wherein the infrared pack recognition system comprises an integrating sphere.

8. A beverage making system according to claim 1, wherein the beverage making apparatus comprises a reference surface for self-calibration of the infrared pack recognition system.

9. A beverage making system according to claim 1, wherein a single measurement (data point) of IR reflectance averaged over the measurement wavelength band and/or averaged over an area of the pack is used to discriminate between different packs of the system.

10. A beverage making system according to claim 9, wherein different packs in the system have a constant visible appearance in the region where reflectance is measured, but different IR reflectances in that region.

* * * * *